United States Patent
Thaden

(10) Patent No.: US 8,834,781 B2
(45) Date of Patent: Sep. 16, 2014

(54) VACUUM SET-UP TO PRESSURIZE A COMPONENT PART DURING ITS PRODUCTION, AND METHOD FOR PRODUCING A COMPONENT PART

(75) Inventors: Bernhard Thaden, Butjadingen (DE); Hannelore Thaden, legal representative, Butjadingen (DE)

(73) Assignee: Premium AEROTEC GmbH, Augsburg (DE)

( * ) Notice: Subject to any disclaimer, the term of this patent is extended or adjusted under 35 U.S.C. 154(b) by 299 days.

(21) Appl. No.: 13/230,310

(22) Filed: Sep. 12, 2011

(65) Prior Publication Data

US 2012/0061871 A1    Mar. 15, 2012

(30) Foreign Application Priority Data

Sep. 13, 2010 (DE) .......................... 10 2010 045 210

(51) Int. Cl.
    *B29C 70/44*    (2006.01)
    *B29C 33/30*    (2006.01)
    *B29L 31/00*    (2006.01)

(52) U.S. Cl.
    CPC .............. *B29C 70/44* (2013.01); *Y02T 50/433* (2013.01); *Y02T 50/43* (2013.01); *B29C 33/301* (2013.01); *B29L 2031/757* (2013.01)
    USPC ........... 264/571; 156/285; 156/382; 264/316; 425/389

(58) Field of Classification Search
    USPC ............... 425/388, 389, 403, 405.1, DIG. 60; 264/316, 571; 156/285, 382
    See application file for complete search history.

(56) References Cited

U.S. PATENT DOCUMENTS

| 3,146,148 | A | * | 8/1964 | Mitchella et al. | 156/382 |
| 4,869,770 | A | * | 9/1989 | Christensen et al. | 156/382 |
| 5,686,038 | A | * | 11/1997 | Christensen et al. | 264/257 |
| 5,709,893 | A | * | 1/1998 | McCarville et al. | 425/389 |
| 5,993,184 | A | * | 11/1999 | Morrow | 425/389 |

(Continued)

FOREIGN PATENT DOCUMENTS

| DE | 602 07 191 T2 | 8/2006 |
| DE | 101 40 166 B4 | 9/2009 |
| DE | 10 2009 001 075 A1 | 9/2010 |

OTHER PUBLICATIONS

European Search Report with English Translation dated Dec. 2, 2011 (two (2) pages).

(Continued)

*Primary Examiner* — Robert B Davis
(74) *Attorney, Agent, or Firm* — Crowell & Moring LLP

(57) ABSTRACT

A vacuum set-up to pressurize a component part during its production is provided. The set-up includes a base with a contact surface for component part, and a casing that is airtight to contact surface that can be sealed to cover component part to effect pressurization of component part by evacuating an internal space of casing. To also effect a defined pressurization of component part on at least one component part edge in lateral direction, on at least this component part edge together with component part, a pressure strip system that can be mounted in the interior space is provided that is formed by at least two pressure strips extending along the component part edge and over inclined planes, that work together in such a way that pressure exerted on pressure strip system by the evacuation of the interior space, generates pressure acting laterally on component part edge.

9 Claims, 2 Drawing Sheets

(56) References Cited

U.S. PATENT DOCUMENTS

| | | |
|---|---|---|
| 6,254,812 B1 * | 7/2001 | Goodridge et al. ............. 264/39 |
| 6,814,563 B2 * | 11/2004 | Amnered et al. ............. 425/389 |
| 6,849,150 B1 * | 2/2005 | Schmidt ........................ 156/285 |
| 2004/0169314 A1 * | 9/2004 | Vaara ........................... 264/258 |
| 2004/0219244 A1 | 11/2004 | Filsinger et al. |

OTHER PUBLICATIONS

Michael Cooke et al., "It's in the Bag", Advanced Composites Engineering, Feb. 1992, vol. 232, No. 2, (two 2 pages) XP000294565.

* cited by examiner

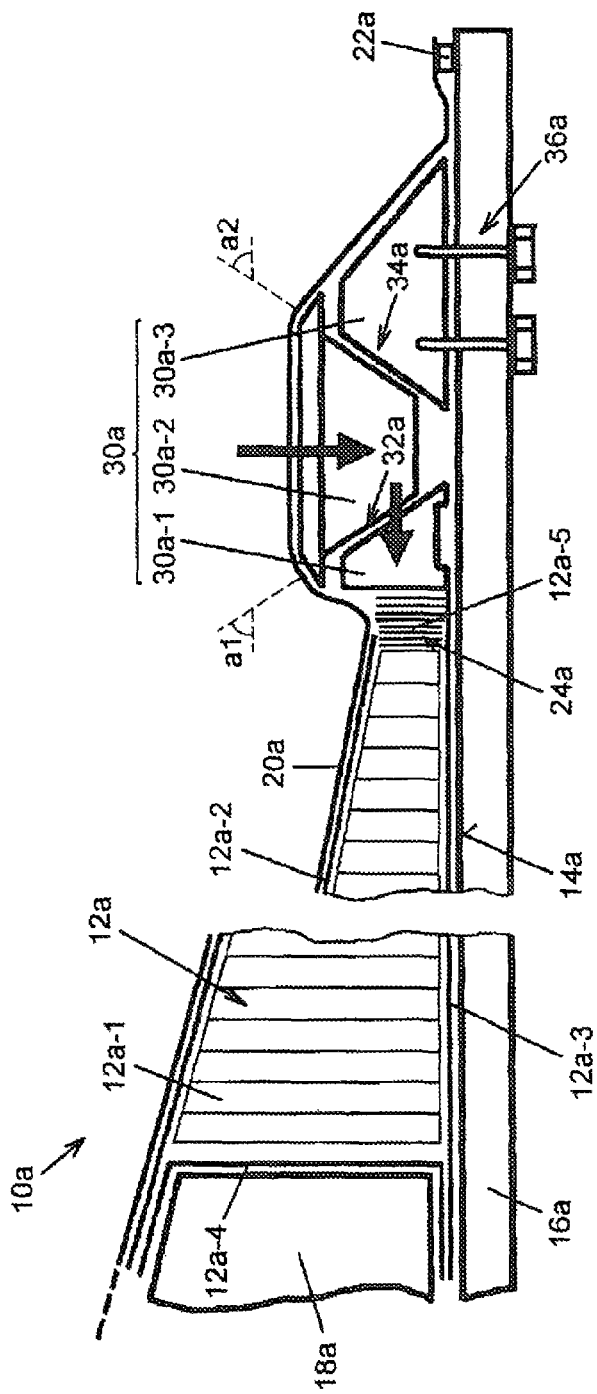
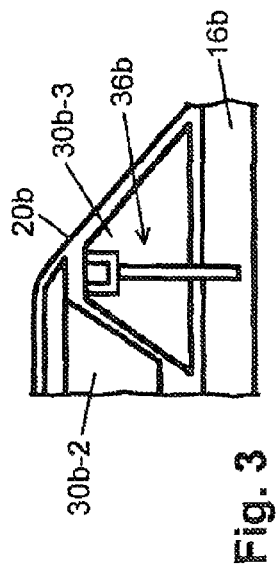

VACUUM SET-UP TO PRESSURIZE A COMPONENT PART DURING ITS PRODUCTION, AND METHOD FOR PRODUCING A COMPONENT PART

CROSS REFERENCE TO RELATED APPLICATIONS

The present application claims priority under 35 U.S.C. §119 to German Patent Application No. 10 2010 045 210.6-16, filed Sep. 13, 2010, the entire disclosure of which is herein expressly incorporated by reference.

BACKGROUND AND SUMMARY OF THE INVENTION

The present invention relates very generally to the production of component parts that are pressurized during the production process such as, in the production of component parts that are formed by several component parts, which are to be joined together and glued together, or in the production of fiber composite components to compact the fiber composite work material and/or to bring the shape close to the final contour.

In particular, according to a first aspect, the present invention relates to a vacuum set-up to pressurize a component part while it is being produced, whereby the component part can, in particular, consist of at least one fiber composite component part and/or a component part that is to be glued on.

The vacuum set-up includes a base with a contact surface for the component part and an air-tight casing that can be sealed toward the contact surface (for example, plastic film) to cover the component part, to effect pressurizing the component part by evacuating the air trapped in the interior space of the casing.

A vacuum set-up of this type is known, for example, from German patent document DE 101 40 166 B4, in which it is used as infiltration and hardening tool in the production of a fiber composite component part. This vacuum set-up is used primarily for the infiltration of a semi-finished textile with a matrix material (e.g. resin system). Beyond that, in the subsequent thermal hardening of the infiltrated semi-finished fiber material, compacting or shaping that is close to the final contour can be achieved advantageously. An air-tight film is used as casing to cover the component part and it is sealed with a gasket that extends around the circumference of the component part to the contact surface of the infiltration and hardening tool. The known vacuum set-up is used to produce a 2-dimensional fiber composite component with relatively low component part thickness, so that the pressurization realized by evacuating the interior space of the casing essentially acts only orthogonally to the flat side of the component part upon the component part.

However, applications also exist in which a lateral pressure (i.e., parallel to the contact surface) acting on at least one edge of the component part is desired during the production of a component part.

This is the case, for example, when in a fiber composite component, a certain compacting in lateral direction and/or shaping in a lateral component part edge is to occur as well due to such pressure.

Lateral pressure is also advantageous then, for example, when one or several component parts forming a component part edge are to be connected with a "component part corpus" while the component part is being produced, and/or are to be firmly connected with each other. Such a connection can be provided, for example, as a "classic" conglutination, or also as a connection by what is referred to as "co-curing" or "co-bonding" in fiber composite technology.

For this, however, the vacuum set-up disclosed in DE 101 40 166 B4 is virtually unsuitable, because as a rule, the film used for pressurization does not mold 2-dimensionally or evenly onto the lateral component part edges. Lateral pressure exerted by the film on the component part edges is therefore often difficult to define or uneven, and cannot be limited for the desired final dimensions of the component parts.

Exemplary embodiments of the present invention provide a defined pressurization of the component part in lateral direction on at least one component part edge in a vacuum set-up of the type mentioned above.

In the vacuum set-up according to the invention, this problem is solved by a pressure strip system that can be mounted on at least one component part edge together with the component part in the interior space of the casing (e.g. film), that is formed by at least two pressure strips extending along the component part edge and over inclined planes working together in such a way, that pressure exerted by the evacuation of the interior space onto the pressure strip system causes the generation of pressure that is exerted laterally onto the component part edge.

The term "evacuation" is intended to describe any noteworthy lowering of pressure in the interior space of the casing of the vacuum set-up in a narrower sense. In general, however, any technique is to fall into this category, by which the pressure in the interior space is significantly lower than the pressure on the exterior side of the casing. In the event an especially large difference in pressure is desired between the interior space and the exterior space of the casing, this can be achieved by passing the vacuum set-up into a pressure vessel or a pressure tank, whereby the increase in exterior pressure that is caused by this, if needed, can also still be supported by applying heat.

By means of such a multi-part pressure strip system, an even and defined contact pressure can be achieved at the pertaining component part edge(s).

The pressure strip system functions, in a manner of speaking, as a "pressure redirection unit" for redirecting the "vertical pressure" (acting orthogonally to the contact surface on the pressure strip system) into a lateral direction (acting upon the component part parallel to the contact surface).

The lateral contact pressure generated according to the invention can be used, for example, for forming the pertaining component part edge(s) of the provided component parts—by pressing—during production of the component part at a component part corpus or on its edge, in order to achieve a particularly close connection between component part corpus and component part edge (e.g. by conglutination and/or fiber material compacting).

In particular, the lateral contact force can also be used for a well-defined "compression" of the pertaining component part edge. As will be evident in the following description of an exemplary embodiment of the invention, the pressure strip system can be designed in such a way that, according to the path, an exactly defined lateral compression of the component part forming the component part edge is achieved with the lateral pressure.

The vacuum set-up according to the invention can be used for nearly any shape of component parts and component part edges.

In particular, these can be fiber composite component parts in the broadest sense, i.e., component parts that are produced at least partially from a matrix material containing embedded reinforcement fibers. A specific application is gluing or laminating on a fiber material (single or multi-layered fiber material) that has been infiltrated with matrix material on at least one edge of the component part corpus, whereby the component part corpus itself can in turn consist of a fiber composite and/or other (e.g. metallic) components.

In accordance with one embodiment of the present invention, the vacuum set-up is used in the production of a 2-dimensional component part. This is to cover, in particular, component parts whose minimum lateral expansion at least doubles, in particular, is at least three times as large as their maximum expansion orthogonal to the contact surface (vertical direction).

For example, by using the invention, structural component parts and modules for vehicles, in particular aircraft can be produced very advantageously. A preferred use of the invention is, for example, the production of wings for aircraft, in particular, airfoils or parts thereof, for example, so-called "end edges" (e.g. aileron, rudder, pitch elevator or other flaps that are mounted displaceable at an aircraft wing or fuselage).

Many possibilities exist for the specific design of the pressure strip system.

According to one embodiment of the invention, the pressure strips work together via at least one inclined plane combination that extends inclined at an angle of 30° to 85° to the contact surface. Each combination of inclined planes can be formed by—abutting each other or sliding off each other—level inclined planes of adjacent pressure strips. The angle of inclination in such an inclined plane combination is determined by a "translation relationship" for the generation of the pressure acting laterally upon the component part edge depending on the pressure acting in vertical direction (orthogonal to the contact surface). Hereby, with a relatively large angle of inclination, for example, even a compressive force from a pressure strip acting on the component part edge in lateral direction on the component part edge can be generated that is larger than the pressure exerted in vertical direction by the pressure strip that works with it. According to one embodiment, the angle of inclination is at least 30°, in particular at least 40°. The laterally acting pressure becomes especially large when an angle of inclination of just under 90° is selected. However, it must be considered that in many applications an especially large lateral pressure (for example, larger than the vertical pressure) is not desired at all, so that often, an angle of inclination of at most 85°, in particular at the most 70° is preferred. Moreover, it must be considered that an angle of inclination that is selected to be especially large shortens that path, by which the pressure strip that is exerting the lateral pressure on the component part edge can be displaced in a vertical displacement of the of the pressure strip working with it toward the edge of the component part. In particular, when such a lateral displacement of the pressure strip exerting lateral pressure on the component part is desired (or is required for exerting a certain lateral pressure), the angle of inclination of the pertaining inclined planes should therefore not be selected all too large.

In one embodiment of the invention a pressure strip of the pressure strip system that is not directly adjacent to the component part edge is provided with a fixation unit for fastening this pressure strip to the contact surface. Accordingly, the pertaining pressure strip can be advantageously supported in lateral direction in such a way that it, when generating the pressure acting laterally upon the component part edge (by at least one additional pressure strip located between the component part edge and this fixated pressure strip) cannot "deviate away from the component part edge" in lateral direction. For this, it is sufficient when the fixation effected by the fixation unit prevents at least one motion of the pertaining pressure strip in the direction away from the component part edge.

Many possibilities exist for the configuration of the fixation unit. According to one embodiment of the invention, the fixation unit includes one or several horizontal bores, in particular bores extending orthogonally to the contact surface of the base (e.g. thread bores) in the pressure strip so that by inserting one or more fixing pins (or screwing in fixing screws), a fastening of the pertaining pressure strip on the contact surface can occur. Each such fixing pin or each such fixing screw then extends out of the bore of the pressure strip and further into a corresponding bore of the base, in order to effect a reliable anchoring of the pertaining pressure strip on the contact surface of the base. In one embodiment of the invention, the base is provided with a number of such corresponding fastening bores, so that the pertaining pressure strip can be fixated in various desired positions on the contact surface of the base depending on the application.

In one embodiment of the invention the fastening bores of the base respectively pass through this base completely, so that fastening pins or fastening screws can be inserted and/or screwed in from the underside of the base through the base and into the fastening bores of the pressure strip. In this embodiment, special sealing provisions are to be provided if necessary, in order to prevent air intake through the through bore-holes of the base into the evacuated interior space.

According to an alternative embodiment of the invention, which does not require such sealing measures, the fastening bores of the base do not completely pass through this base, i.e., they are formed as blind holes so that the fastening pins and/or fastening screws can extend from the upper side of the base into these blind holes of the base. In a more particular embodiment of the invention, the bores of the pressure strip are formed as through bore-holes, so that the fastening pins and/or fastening screws can be inserted and/or screwed in from the top, through the pressure strip, and further into the blind holes of the base.

In one embodiment of the invention the pressure strip system includes at least three adjacent pressure strips extending along the pertaining component part edge, of which the middle pressure strip works together with inclined plane combinations provided on both sides with the two outer pressure strips.

Preferably, angles of inclination, as already explained above, can be selected for both inclined plane combinations, whereby the two angles of inclination of the inclined plane combination provided on both sides of the middle pressure strip can be identical or can be selected to be different from each other.

That pressure strip which is located between the component part edge and the middle pressure strip can, for example, load this component part edge directly in lateral direction with its lateral surface that is facing the component part edge. Accordingly, an especially even distribution of the generated lateral pressure results, for example, when the pertaining lateral surface of this pressure strip is adapted to the shape of the component part edge. In the simplest case, this component part edge and correspondingly the lateral surface that is facing this component part edge of the pressure strip are level and extend, for example, orthogonal to the contact surface.

According to one embodiment of the invention, during the lateral pressurization of the component part edge, a more or less pronounced compression of the component part edge occurs by means of which the component part edge or the lateral component part edge surface is finally given the desired shape of the completed component part. For this purpose, the lateral surface of the pressure strip that is exerting the lateral pressure on the component part edge can be designed with the desired shape for the completed component part (for example, level or also curved, tiered, etc. depending on the desired final geometry of the component part edge). Thereby, subsequent processing of the component part edge can advantageously be simplified or even become entirely dispensable for achieving a desired final geometry.

As an alternative to a direct abutment of this outer pressure strip at the component part edge, at least one "adapter strip" in the vacuum set-up can be interposed between the pressure strip (exerting lateral pressure) and the component part edge, for example, in order to accomplish a shape adaptation of the surface that is exerting the lateral pressure to the form of the component part edge with such a strip.

The other one of the two outer pressure strips, i.e., that pressure strip which is located on the side of the middle pressure strip that is facing way from the component part edge, can be provided advantageously with a fixation unit of the type already described above, in order to prevent a motion of this pressure strip in the direction away from the component part edge. This pressure strip then functions so to speak as "support strip" that prevents a drawing back of the entire pressure strip system away from the component part.

As an alternative to a fixable pressure strip for support, instead of such a fixable pressure strip, a comparable industrial design of the contact surface of the base ("support shoulder") or the contact surface with a fixed "support strip" at this position can be employed. However, this has the disadvantage that then the position of this support strip or support shoulder of the contact surface is fixed in advance. For this reason, a solution with a subsequently fixable support strip is better most of the time, in particular when the specific position of this support strip is to be variably selectable (for example, for producing component parts of various dimensions by using the same base or contact surface of the base).

The several pressure strips of the pressure strip system can, for example, be made of metal. In one embodiment, the pressure strip system consists of pressure strips extending straight, in particular, straight pressure strip profiles. This embodiment is particularly suited for the production of component parts with a correspondingly straight progression of the pertaining component part edge.

The pressure strip that lies anterior to the component part edge can have any shape corresponding to the desired component part edge in body contour and contour. In particular radii, for example, various angles, bezels and gradings are possible in the component part cross-section of the component part edge.

The pressure strip or "support strip" fixed on the base should, as a rule, be fixed running parallel to the component part edge. A middle pressure strip and/or a pressure strip extending directly adjacent to the component part edge can, for example, respectively be provided for the entire length with equal cross sections, for example, straight elongated profile strips.

According to a second aspect of the invention, a method is provided for producing a component part using a vacuum set-up of the type described above. The special embodiments and further developments already described above for the vacuum set-up can also be used in an analogous way for the production method according to the invention.

In one embodiment of the production method according to the invention, a pressure strip of the pressure strip system that is not directly adjacent to the component part edge is fixed onto the contact surface of the base before—by evacuating the interior space of the casing—pressurization of the component part and generation of lateral pressure on the component part edge is generated.

Other objects, advantages and novel features of the present invention will become apparent from the following detailed description of one or more preferred embodiments when considered in conjunction with the accompanying drawings.

BRIEF DESCRIPTION OF THE DRAWINGS

In the following, the invention is described further with the aid of an exemplary embodiment referring to the enclosed drawings. Shown are.

DETAILED DESCRIPTION OF THE DRAWINGS

Figure 1:
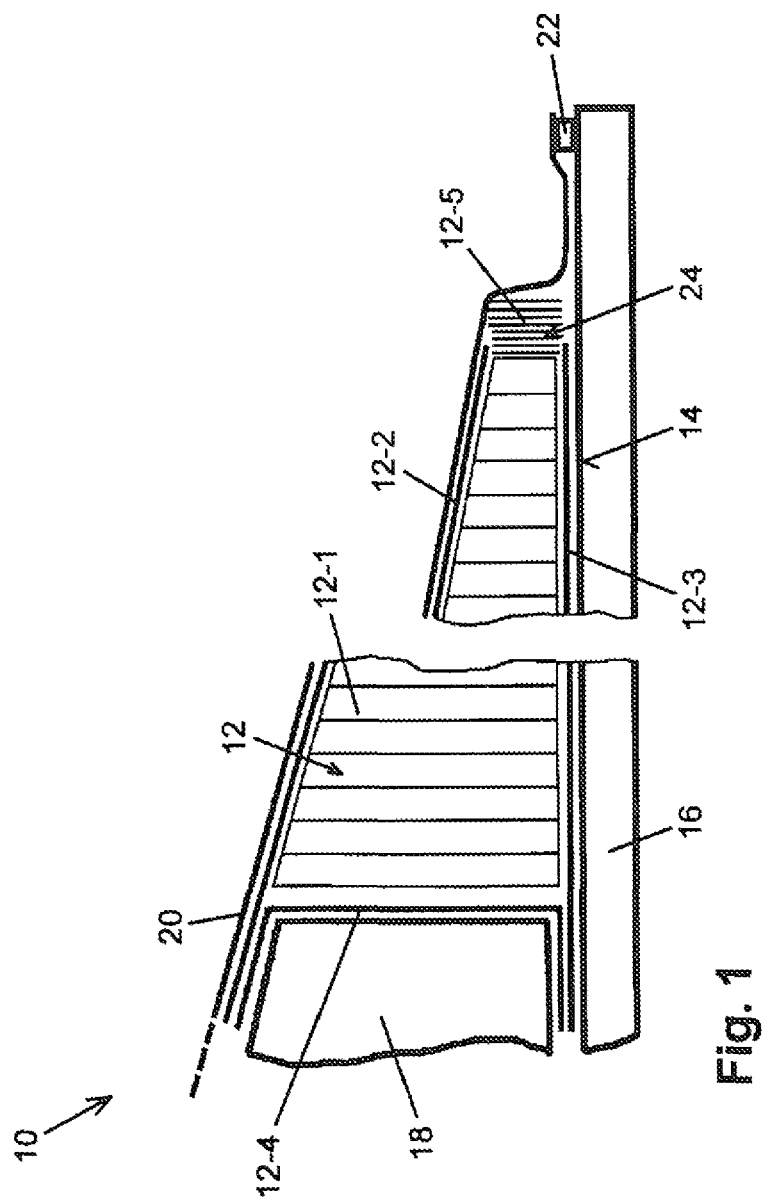
FIG. 1 a diagram of the production of a component part by using a vacuum set-up according to an embodiment not according to the invention FIG. 2 a diagram of an exemplary embodiment according to the invention corresponding to FIG. 1, and FIG. 3 a detail from FIG. 2 in a modified embodiment.

FIG. 1 shows a vacuum set-up 10 in a schematic lateral view to pressurize a component part 12 during its production.

In the illustrated exemplary embodiment, component part 12 is the edge of an aircraft airfoil, which consists of several component parts 12-1 to 12-5.

Component parts 12-1 to 12-5 consist of an aluminum honeycomb structure 12-1, aluminum sheet metal 12-2, 12-3 and 12-4 surrounding and/or limiting this honeycomb structure 12-1, as well as a multilayer semi-finished textile that has been pre-impregnated with a resin material (e.g. epoxy resin) (Prepreg) 12-5. Adhesive layers that are interspersed respectively between the honeycomb structure 12-1 and the adjacent sheet metal 12-2 to 12-4 are not shown in the Figure.

During production of component part 12, a deep connection of component parts 12-1 to 12-5 is to be achieved by pressurization. Aluminum sheet metal 12-2, 12-3 and 12-4 are glued onto a—in the Figure upper, lower and/or lateral left edge of the aluminum honey comb structure 12-1, whereas the multi-layered pre-impregnated semi-finished textile (Prepreg) 12-5—due to its hardening—is firmly connected with the—in the Figure—right edge on the side of the honey comb structure 12-1. In this example, Prepreg 12-5 is formed by 8 layers of glass fiber layers pre-impregnated with epoxy resin (for example, fabric or meshwork).

For this purpose, the individual component parts 12-1 to 12-5 are first, as shown in FIG. 1, located at a contact surface 14 of a base (tool) 16. Shown on the left in FIG. 1 is a "holm filler piece" 18, which is a part of the production tool that also has base 16, and is located stationary with respect to base 16. Different than the shown exemplary embodiment in which contact surface 14 (corresponding to the underside of component part 12 that is to be produced) is level, contact surface 14 could also be curved or have a different shape.

Then, component part 12 is covered with an airtight film 20, this film 20 is sealed toward contact surface 14, and then an interior space of the casing created with film 20 is evacuated. Airtight or gastight films or film materials suitable for this are known in prior art (for example, on the basis of PTFE, FEP, etc.). In the case of such a component part production at a higher temperature, a sufficiently heat-resistant (e.g. up to 200° C.) film can be used.

This evacuation of the space under film 20 has the effect that the ambient pressure above the film (e.g. atmospheric pressure) exerts a corresponding pressure via film 20 onto component part 12 that is locked in the interior space between film 20 and contact surface 14.

The evacuation of the interior space is accomplished with a (not shown) vacuum pump, which is connected with this interior space by a vacuum line passage. The vacuum passage can, for example, be designed as a hose, which is connected with the interior space by penetrating film 20 at one position of this film 20. Alternatively, the vacuum passage can also end in the interior space via a channel that extends through base 16.

In the illustrated example, the sealing of film 20 toward contact surface 14 is accomplished by providing a gasket 22 that revolves around the circumference of component part 12.

In order to increase the pressurization of component part 12 that is caused by the evacuation of the interior space, the entire vacuum set-up 10 shown in FIG. 1 can finally also be put into a pressure chamber (autoclave) in order to expose vacuum set-up 10 to increased ambient pressure (typically approximately 2 to 5 bar).

It is disadvantageous in the illustrated vacuum set-up 10, or the thereby realized production method for component part 12 an only insufficient, not well defined and under certain circumstances also uneven pressurization of the one—in the Figure on the right component part edge 24 of component part 12-5 that is to be formed in lateral direction, i.e. parallel to contact surface 14 in this section.

In particular, the uneven pressurization can lead to that component part 12-5, which is formed here as multi-layered pre-impregnated laminate (Prepreg), is not optimally connected with the component part corpus (here: aluminum honey comb structure 12-1), and/or the individual layers of this component part 12-5 tend to de-laminate on the completed component part 12.

This problem can be eliminated by a small modification of vacuum set-up 10. A corresponding exemplary embodiment of the invention is described in the following with reference to FIG. 2.

In the following description of the exemplary embodiment according to the invention, the same reference numbers are used for equally acting components, respectively complemented by a small letter "a" to differentiate the embodiment. Thereby, essentially only the differences related to the exemplary embodiment already described with reference to FIG. 1, are addressed and for the remainder, reference is herewith expressly made to the description of the preceding exemplary embodiment.

FIG. 2 shows a vacuum set-up 10*a* for pressurizing a component part 12*a* (identical with component part 12).

Vacuum set-up 10*a* has the same components as vacuum set-up 10, which already was described above, in addition, however, also a pressure strip system 30*a* located in FIG. 2 on the side of the right component part edge 24*a* together with a component part 12*a* in the interior space of an airtight film (casing) 20*a*.

Pressure strip system 30*a* is thus likewise pressurized by film 20*a* in vertical direction (orthogonally) to contact surface 14*a* of a base 16*a*. This vertical pressure load is symbolized in FIG. 2 by a vertical arrow.

The pressure strip system 30*a* in the illustrated exemplary embodiment is formed by three pressure strips 30*a*-1, 30*a*-2 and 30*a*-3, which extend as shown in lateral direction (parallel to contact surface 14*a* and orthogonal to component part edge 24*a*) adjacent to each other respectively along component part edge 24*a*.

Very generally, the pressure strip system (here: pressure strips 30*a*-1, 30*a*-2 and 30*a*-3) comprises several pressure strips that work together via inclined planes in such a way that the pressure exerted on the pressure strip system by evacuating the interior space ("vertical pressure") causes the generation of pressure acting laterally on the component part edge ("lateral pressure").

In FIG. 2, such a lateral pressure is symbolized by the horizontally extending arrow. The lateral pressure is generated by the joint action of middle pressure strip 30*a*-2 of pressure strip system 30*a*, with pressure strips 30*a*-1 and **30-*a*-2 adjacent to it on both sides. This joint action occurs via an inclined plane combination 32***a* in FIG. 2 between pressure strips 30*a*-1 and 30*a*-2, and an inclined plane combination 34*a* between pressure strips 30*a*-2 and 30*a*-3 in FIG. 2.

Pressure strip 30*a*-3 is affixed in the illustrated exemplary embodiment using a screw connection 36*a* at base 16*a*, or contact surface 14*a*.

When, in the illustrated situation, the vertical pressure acts upon middle pressure strip 30*a*-2, at inclined plane combinations 32*a* and 34*a*, respective lateral pressure components are generated, the magnitude of which depends on the angles of inclination a1 and a2 that are provided at the inclined planes combination 32*a*, 34*a*. In the illustrated example, all pressure strips 30*a*-1 to 30*a*-3 are designed as metal profile strips that extend straight (corresponding to component part edge 24*a*).

In the illustrated exemplary embodiment, the angles of inclination a1 and a2 are respectively approximately 55°, from which a lateral pressure results, which corresponds to approximately 0.7 times the vertical pressure. By a modification of the angles of inclination a1 and a2, the "power translation ratio" (between vertical pressure and lateral pressure) can be adjusted to the specific application in a wide range. For the "pressure translation ratio" between vertical pressure and lateral pressure (respectively force per surface) the size relationship of those surfaces also plays a role, at which film 20*a* vertically loads pressure strip 30*a*-2, or pressure strip 30*a*-1 laterally loads component part 12*a*-5. In the specific configuration of pressure strip system 30*a*, this relationship of surfaces must therefore also be considered. In this connection it is to be noted that deviating from the illustrated exemplary embodiment, even a non-level lateral plane could be used at the pressure strip (30*a*-1), in order to achieve an uneven lateral pressure load of the pertaining component parts (12*a*-5) in a targeted way, if so desired.

Summarizing, the fixated pressure strip 30*a*-3 of vacuum set-up 10*a* according to the exemplary embodiment described serves, in a manner of speaking, as an initial pressure strip and initial fixation that has—on its side facing component part 12*a*—an inclined edge, in order house the middle pressure strip 30*a*-2 that is guided vertical to pressure strips 30*a*-1 and 30*a*-3 like a wedge. Pressure strip 30*a*-1 is attached to component part 12*a* or its component part edge 24*a* and has—on its side facing away from component part 12*a*—likewise an inclined edge for housing the vertically guided middle pressure strip 30*a*-2. During the course of the method, by the force that is guided downward (vertical) of middle pressure strip 30a-2 with inclined edges on both sides (parallel to the inclined planes of pressure strips 30*a*-1 and 30*a*-2), the progression of force is redirected to pressure strip 30*a*-1 (horizontal progression of pressure). Pressure strip 30*a*-1 is thus pressed on uniformly and defined onto the composite design of component part 12*a*.

Advantageously, pressure strip system 30*a* in the illustrated exemplary embodiment causes that component parts 12*a*-5 (fiber composite laminate) to be pressed on reliably and very evenly while compacting and hardening and with very uniform lateral pressure load at component part corpus 12-1 and thus forms component part edge 24*a*.

Such a uniform distribution of lateral pressure along component part edge 24a supplies a uniform surface quality and consistency, as well as sufficient compacting of the multi-layered laminate 12a-5 in the composite construction, so that a delamination of completed component part 12a is avoided.

One particularity of the illustrated example is that a vertical motion of the middle pressure strip 30a-2 is limited by a defined mechanical stop so that the maximum vertical motion and correspondingly the maximum lateral motion of pressure strip 30a-1 that exerts the lateral pressure is limited. In FIG. 2, on the upper side of middle pressure strip 30a-2, suitable lateral protrusions can be seen for this purpose, which abut at the upper sides of the outer pressure strips 30a-1 and 30a-2 in a vertical motion and thus limit the vertical motion of the middle pressure strip 30a-2. As an alternative to this type of vertical motion stop, consideration can be given to inserting, for example, a "stop strip" of a certain height, in FIG. 2, underneath middle pressure strip 30a-2 (not shown), the upper side of which then forms a stop for the underside of pressure strip 30a-2 during its lowering motion.

An initially desired height position (prior to evacuating the interior space of casing 20a) of middle pressure strip 30a-2 results in the illustrated example by the initially arranged configuration of the three pressure strips 30a-1 to 30a-3 in lateral direction. In order to make this manually executed configuration easier, for example, the middle pressure strip 30a-2 can, for example, be provided with a spring unit (not shown), which is supported by contact surface 14a, and retains pressure strip 30a-2—by overcoming the force of its weight—at the desired initial distance (height) to the contact surface, and which after the start of the evacuation is "pressed over" by the application of vertical pressure.

By providing a vertical movement stop, a well-defined path "lateral compression" of component part edge 24a is achieved that is used in addition to the compression of laminate 12a-5, also for achieving the desired "end contour geometry" of the lateral edge of component part 12 that is formed by laminate 12a-5 (so that no subsequent processing is required at this position).

In the illustrated exemplary embodiment, pressure strip arrangement 30a is mounted at only one component part edge (in FIG. 2 on the right). On the opposite component part edge (in FIG. 2 on the left), the stationary holm filler piece 18a also forms a lateral support, which prevents a deviation of the component part 12a as a consequence of applying lateral pressure. Alternatively, component part 12a could also be supported in a different way.

As has already been mentioned in the illustrated example, component part edge 24a extends straight, so that pressure strips 30a-1 to 30a-3 can correspondingly be used as pressure strip profiles that extend straight. However, deviating from that, pressure strip system 30a overall could also extend somewhat curved and/or consist of flexible pressure strips. Alternatively, for an adaptation to a curved component part edge 24a, a correspondingly curved shape of the lateral surface of pressure strip 30a-1 could also be provided, which comes to bear on component part edge 24a.

Deviating from the illustrated example, pressure strip 30a-3 could also, for example, be replaced by a strip that is firmly connected with base 16a or contact surface 14a, or such a strip could be provided integral with base 16a as "support shoulder".

FIG. 3 illustrates a modified embodiment of the exemplary embodiment according to FIG. 2, with respect to the pressure strip fixation.

A pressure strip 30b-3 shown in FIG. 3 is likewise fixated using a screw connection 36b on a base 16b. The fastening bores of base 16b are designed, however, as blind holes with an inner thread, so that in the illustrated example, fastening screws (e.g. with internal hexagonal head) can be screwed into these blind holes from the upper side of base 16b. The bores of pressure strip 30b-3 are formed as through boreholes through which the fastening screws are placed from the top, whereby in the screwed in state, the screw heads are housed in a respective recess at the bore hole top of the through bore-hole.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A vacuum set-up to pressurize a component part while it is being produced, the set-up comprising
 a base with a contact surface configured to contact the component part;
 an air-tight casing that is sealable toward contact surface to cover the component part to effect pressurization of component part by evacuating an interior space of casing; and
 at least one pressure strip system mounted at a component part edge of the component part in the interior space of the casing, the at least one pressure strip system comprising at least two pressure strips extending along the component part edge and over inclined planes, the at least two pressure strips arranged in such a way that pressure generated on the at least one pressure strip system by evacuation of the interior space of the casing causes generation of pressure acting laterally on the component part edge,
 wherein a pressure strip of the pressure strip system that is not directly adjacent to the component part edge is
 provided with a fixation unit that fixes this pressure strip at the contact surface of the base, or
 formed by a fixed support shoulder or fixed support strip on the contact surface of the base.

2. The vacuum set-up according to claim 1, wherein the at least two pressure strips are arranged to cause generation of the pressure acting laterally on the component part edge via the inclined planes, which extend at an angle inclined between 30° to 85° to the contact surface of the base.

3. A vacuum set-up to pressurize a component part while it is being produced, the set-up comprising
 a base with a contact surface configured to contact the component part;
 an air-tight casing that is sealable toward contact surface to cover the component part to effect pressurization of component part by evacuating an interior space of casing; and
 at least one pressure strip system mounted at a component part edge of the component part in the interior space of the casing, the at least one pressure strip system comprising at least two pressure strips extending along the component part edge and over inclined planes, the at least two pressure strips arranged in such a way that pressure generated on the at least one pressure strip system by evacuation of the interior space of the casing causes generation of pressure acting laterally on the component part edge,
 wherein the at least two pressures strips include three pressure strips, a first of the three pressure strips is configured to contact the component part and to move laterally with respect to the base, a second of the three pressure strips is fixed to the contact surface of the base, and a third of the three pressure strips is configured to move horizontally with respect to the contact surface of the base, and wherein the three pressure strips are configured so that the horizontal movement of the second pressure strip causes the first pressure strip to move laterally towards the component part, and the first pressure strip is the only one of the three pressure strips that is configured to contact the component part.

4. The vacuum set-up according to claim 1, wherein the at least one component part is a fiber composite component part.

5. A method for producing a component part, comprising:
pressurizing the component part using a vacuum set-up comprising a base with a contact surface configured to contact the component part and an airtight casing sealable to the contact surface for covering the component part, to bring about, by evacuating an interior space of casing, pressurization of component part, wherein at a pressure strip system is mounted on at least one component part edge of the component part in the interior space of the casing, the pressure strip system comprising at least two pressure strips extending along the component part edge and over inclined planes, the at least two pressure strips arranged in such a way that pressure generated on the at least one pressure strip system by evacuation of the interior space of the casing causes generation of pressure acting laterally on the component part edge, wherein a pressure strip of the pressure strip system that is not directly adjacent to the component part edge is
provided with a fixation unit that fixes this pressure strip at the contact surface of the base, or
formed by a fixed support shoulder or fixed support strip on the contact surface of the base.

6. The vacuum set-up according to claim 1, wherein the pressure strip system comprises three pressure strips configured such that horizontal movement of one of the three pressure strips causes lateral movement of a second one of the three pressure strips.

7. The vacuum set-up according to claim 1, wherein the pressure strip system comprises three pressure strips configured so that only one of the three pressure strips is configured to contact the component part.

8. The vacuum set-up according to claim 3, wherein the three pressure strips are arranged to cause generation of the pressure acting laterally on the component part edge via the inclined planes, which extend at an angle inclined between 30° to 85° to the contact surface of the base.

9. The vacuum set-up according to claim 3, wherein the at least one component part is a fiber composite component part.

* * * * *